United States Patent
Ku et al.

(10) Patent No.: US 9,912,501 B2
(45) Date of Patent: Mar. 6, 2018

(54) SIGNAL DETECTION METHOD AND SIGNAL RECEIVING DEVICE FOR ENHANCING RELIABILITY OF CODE RATE SEARCH

(71) Applicant: MStar Semiconductor, Inc., Hsinchu Hsien (TW)

(72) Inventors: Yu-Hsien Ku, Hsinchu Hsien (TW); Chia-Wei Chen, Hsinchu Hsien (TW); Kai-Wen Cheng, Hsinchu Hsien (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 0 days.

(21) Appl. No.: 15/256,991

(22) Filed: Sep. 6, 2016

(65) Prior Publication Data

US 2017/0338980 A1    Nov. 23, 2017

(30) Foreign Application Priority Data

May 20, 2016  (TW) .............................. 105115768 A

(51) Int. Cl.

| H04L 27/00 | (2006.01) |
| H04L 25/40 | (2006.01) |
| H04B 1/16  | (2006.01) |
| H04L 27/34 | (2006.01) |

(52) U.S. Cl.
CPC ............... *H04L 25/40* (2013.01); *H04B 1/16* (2013.01); *H04L 27/3483* (2013.01)

(58) Field of Classification Search
CPC ..... H04B 3/54; H04B 10/516; H04L 25/4902; H04L 1/009
USPC ......... 375/259, 260, 265, 341; 370/329, 335
See application file for complete search history.

(56) References Cited

U.S. PATENT DOCUMENTS

| 2009/0103646 A1* | 4/2009 | Dowling ............... H03M 13/31 |
| | | 375/265 |
| 2013/0308729 A1* | 11/2013 | Vainsencher ......... H04L 25/067 |
| | | 375/341 |

FOREIGN PATENT DOCUMENTS

CN         1599868 A      3/2005

* cited by examiner

*Primary Examiner* — Khai Tran
(74) *Attorney, Agent, or Firm* — Edell, Shapiro & Finnan, LLC

(57) ABSTRACT

A signal detection method associated with a constellation diagram corresponding to a modulation scheme is provided for enhancing the reliability of code rate search. A mask is provided between two adjacent constellation points in the modulation scheme. The signal detection method includes: receiving a plurality of signals, and mapping the plurality of signals to the constellation diagram; when a first signal among the plurality of signals is located in the mask, discarding the first signal; and when a second signal among the plurality of signals outside located in the mask, determining a constellation point corresponding to the second signal.

12 Claims, 8 Drawing Sheets

SIGNAL DETECTION METHOD AND SIGNAL RECEIVING DEVICE FOR ENHANCING RELIABILITY OF CODE RATE SEARCH

This application claims the benefit of Taiwan application Serial No. 105115768, filed May 20, 2016, the subject matter of which is incorporated herein by reference.

BACKGROUND OF THE INVENTION

Field of the Invention

The invention relates in general to a signal detection method and a signal receiving device, and more particularly to a signal detection method and a signal receiving device capable of enhancing the reliability of code rate search.

Description of the Related Art

In a digital communication system, a signal transmitter may select different code rates to transmit signals according to different signal modulation schemes and channel environments. For example, in 8 phase shift key (8PSK) modulation, a signal transmitter may transmit signals according to a selected code rate. Each code rate may correspond to a signal distribution method on a constellation diagram.

However, a signal receiver may be incapable of learning the code rate that the transmitter selects, and thus has no way of knowing the type of signal. In one common signal receiving method of known technologies, decoding and comparison are performed using various possible code rates to obtain the correct code rate that is then used for reception. This method is extremely complex and consumes large amounts of computation resources. Therefore, there is a need for a method for more effectively determining a code rate of signals.

SUMMARY OF THE INVENTION

The invention is directed to a signal detection method and a signal receiving device, which are capable of determining a code rate of signals according to the distribution of received signals on a constellation diagram as well as enhancing the reliability of code rate search through a mask provided.

The present invention discloses a signal detection method associated with a constellation diagram corresponding to a modulation scheme and used to enhance the reliability of code rate search. A mask is included between two adjacent constellation points in the constellation diagram. The signal detection method includes: receiving a plurality of signals, and mapping the plurality of signals to the constellation diagram; when a first signal among the plurality of signals is located in the mask, discarding the first signal; and when a second signal among the plurality of signals is not located in the mask, determining the constellation point corresponding to the second signal.

The present invention further discloses a signal receiving device for performing a signal detection method to enhance the reliability of code rate search. The signal detection method is associated with a constellation diagram corresponding to a modulation scheme. A mask is included between two adjacent constellation points in the constellation diagram. The signal receiving device includes a signal receiving module, a processing device and a storage unit. The signal receiving module receives a plurality of signals. The processing device executes a program code. The storage unit, coupled to the processing device, stores the program code. The program code instructs the processing device to perform steps of: mapping the plurality of signals received to the constellation diagram; when a first signal among the plurality of signals is located at the first mask, discarding the first signal; and when a second signal among the plurality of signals is not located in the mask, determining the constellation point corresponding to the second signal.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
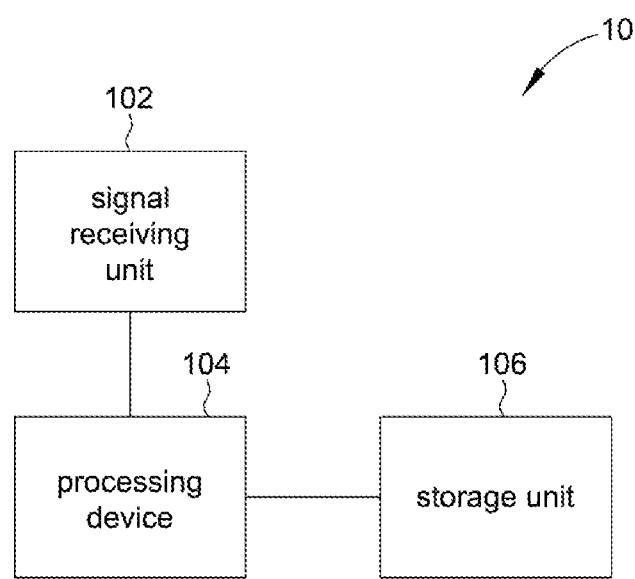
FIG. 1 is a block diagram of a signal receiving device according to an embodiment of the present invention.

FIG. 1 shows a schematic diagram of a signal receiving device 10 according to an embodiment of the present invention. As shown in FIG. 1, the signal receiving device 10 includes a signal receiving module 102, a processing device 104 and a storage unit 106. The signal receiving module 102 receives a signal and transmits the signal to the processing device 104. The processing device 104 executes a program code stored in the storage unit 106 to perform a code rate search method having a high reliability on the received signal. More specifically, the signal received by the signal receiving module 102 is first mapped to a constellation diagram, on which a mask is included between two adjacent constellation points. The processing device 104 sequentially determines whether each received signal is located in the mask. When a signal is located in the mask, the signal is discarded and the constellation point corresponding to the signal is not determined; when a signal is not located in the mask, the constellation point corresponding to the signal is determined. The processing device 104 then determines the code rate of the signals that have been filtered by the mask.

In known technologies, all signals received are determined as constellation points on a constellation. In contrast, in the embodiment of the present invention, corresponding constellation points are determined for only signals that are not located in the mask. Preferably, the mask is disposed between two adjacent constellation points, and is substantially evenly spaced from these two adjacent constellation points. In the above situation, a signal in the mask is frequently a signal for which the corresponding constellation point is more difficult to determine, and the signal may produce a greater error because it suffers from the effects of larger noises. On the other hand, a signal outside the mask is frequently close to a constellation point, and so it is easy to determine that the closest constellation point is the corresponding constellation point while yielding a lower error rate. Therefore, as only signals that are outside the mask are determined, higher accuracy and reliability can be obtained.

Figure 2:
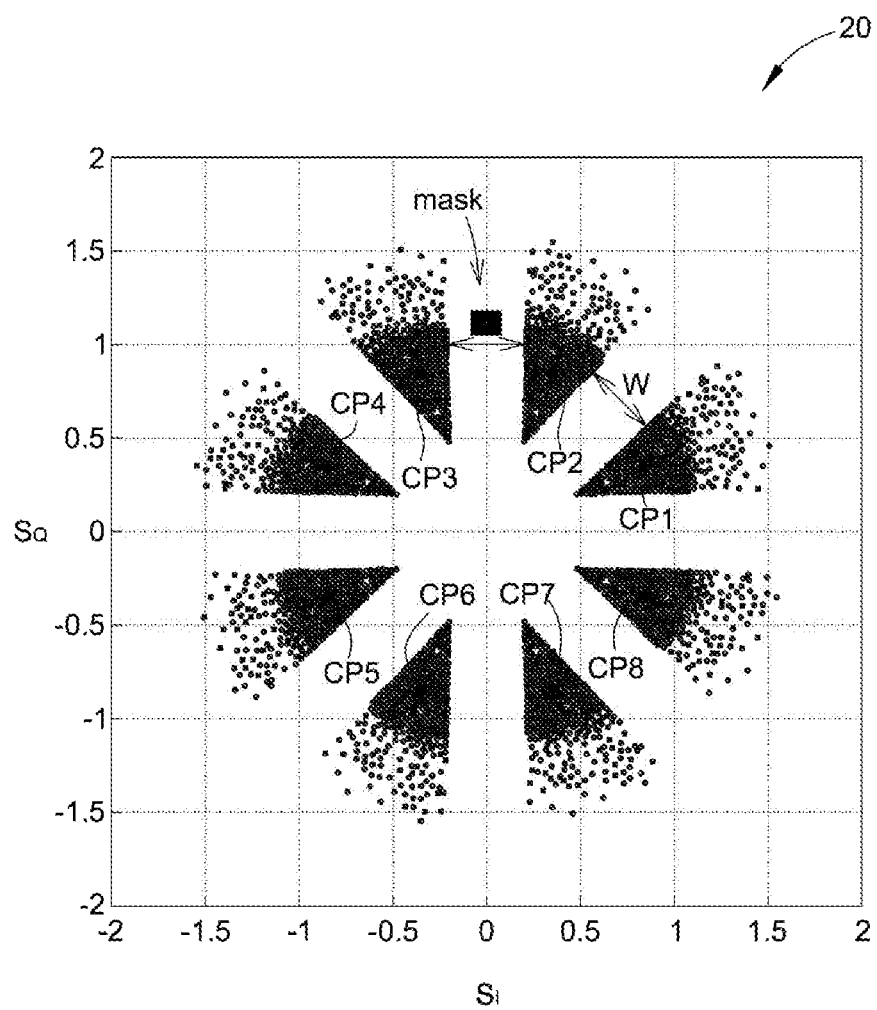
FIG. 2 is a schematic diagram of a constellation diagram according to an embodiment of the present invention.

FIG. 2 shows a schematic diagram of a constellation diagram 20 according to an embodiment of the present invention. The constellation diagram 20 includes multiple signals that the signal receiving device 10 receives within a period, and each of the signals is represented as a signal point on a complex plane based on its signal characteristics (e.g., strength and phase). In this example, the encoding mechanism of the signals is 8PSK, and so the constellation diagram 20 includes eight constellation points CP1 to CP8 that are evenly arranged around the origin of the complex plane. The signal points are distributed around the constellation points. The processing device 104 may determine the respective constellation points corresponding to the signals according to the positions of the signal points to further determine bit information carried in the signals.

It is known by further referring to FIG. 2 that, a mask is included between every two adjacent constellation points. The mask is bordered by straight lines perpendicular to a connecting line of the two adjacent constellation points, and has a width W that can be set as desired. Further, the position of the mask substantially covers a range that is approximately equally distanced from the two adjacent constellation points, e.g., it is more difficult to determine the constellation point corresponding to a signal falling in this range. For example, between the constellation points CP2 and CP3, the distances of a signal point in the mask from the constellation point CP2 and from the constellation point CP3 are close, and so it is more difficult to determine the constellation point corresponding to this signal while a higher determination error rate may be yielded. Further, the distances from the borders of the mask to the two adjacent constellation points are substantially equal. For example, as shown in FIG. 2, for the mask between the constellation points CP2 and CP3, the distance from the left border to the constellation point CP3 is substantially equal to the distance from the right border to the constellation point CP2. In the present invention, a signal point in the mask and cannot be determined easily is discarded, such that the reliability of code rate search can be enhanced. It should be noted that, only signal points that are not located in the mask are depicted (i.e., the signals selected for determining the code rate), and the mask in fact includes other signal points (i.e., signals that are discarded).

As a mask is included between every two adjacent constellation points, all the mask may then form a mask range on the constellation diagram 20. The mask range may be represented by equations below:

$$|s_I| \leq \frac{w}{2}$$

$$|s_Q| \leq \frac{w}{2}$$

$$||s_I| - |s_Q|| \leq \sqrt{2} \times \frac{w}{2}$$

In the above equations, $s_I$ represents the X-axis of a complex plane (a real part of a complex number), $s_Q$ represents the Y-axis of a complex plane (an imaginary part of the complex number), and W represents the width of the mask. That is to say, the mask range may be represented as a union of the three equations above. Given that a signal $s=s_I+j\times s_Q$ falls in the range of any of the above equations, it means that the signal is located in the mask and is discarded.

In other words, the mask may be used to filter out signal points prone to misjudgment to thereby enhance the reliability of signal determination. Further, the width of the mask may be adjusted as desired according to system requirements. In general, the accuracy in signal determination gets higher as the width of the mask increases. After filtering out the signal points prone to misjudgment using the mask, the present invention further determines the code rate of the received signal. Any type of code rate may correspond to a constellation diagram distribution in the constellation diagram, and constellation points of each constellation diagram distribution in the constellation diagram differ. In the above situation, the signal receiving device may determine whether corresponding constellation points match a predetermined constellation diagram distribution according to positions of the signals on the constellation point, and accordingly determine whether the signals received within a period correspond to a code rate corresponding to the predetermined constellation diagram distribution.

More specifically, the signal receiving device may retrieve a part of the constellation points from the eight constellation points corresponding to 8PSK as the predetermined constellation diagram distribution. These constellation points correspond to a predetermined code rate, and may have a distribution that belongs to a predetermined modulation scheme (e.g., quadrature phase shift keying (QPSK), or binary phase shift keying (BPSK)). Next, the signal receiving device may determine whether a signal received within a period is a constellation point located in the predetermined constellation diagram distribution (e.g., a constellation point belonging to the predetermined code rate). The signal receiving device may sequentially determine the signals. In one embodiment, a counter may be disposed in the signal receiving device. Each time a signal corresponding to a constellation point located in the predetermined constellation diagram distribution is received, a counter value of the counter is added by one. According to the counter value of the counter, the signal receiving device may determine, out of the signals that are not located in the mask, a ratio of the signals located at the constellation points of the predetermined constellation diagram distribution. That is to say, after filtering out the signals located in the mask, for the signals that are not located in the mask, by determining the ratio of the signals located at the constellation points of the predetermined constellation diagram distribution, the code rate of the received signals may be learned.

Figure 3A:
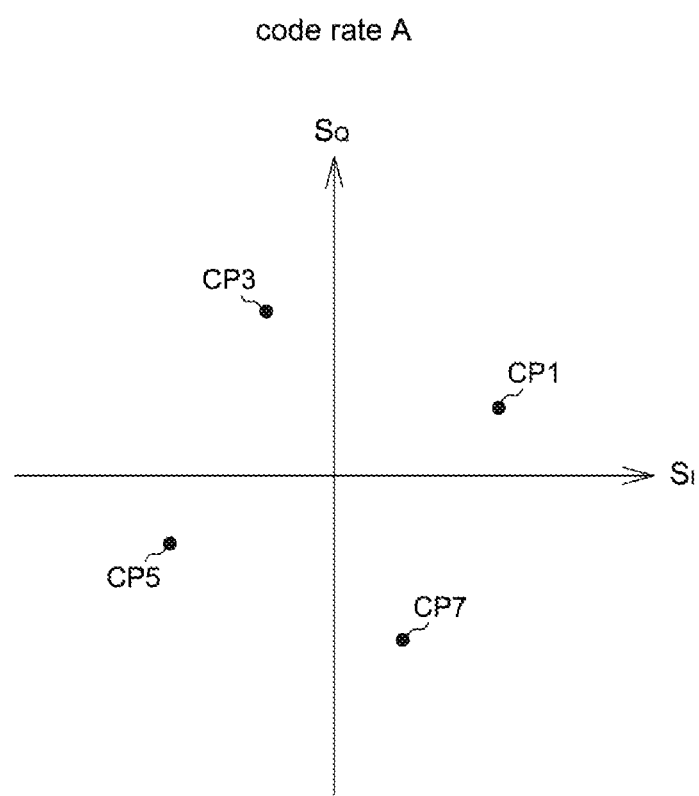
FIG. 3A and FIG. 3B are schematic diagrams of code rates including different constellation points according to an embodiment of the present invention.
Figure 3B:
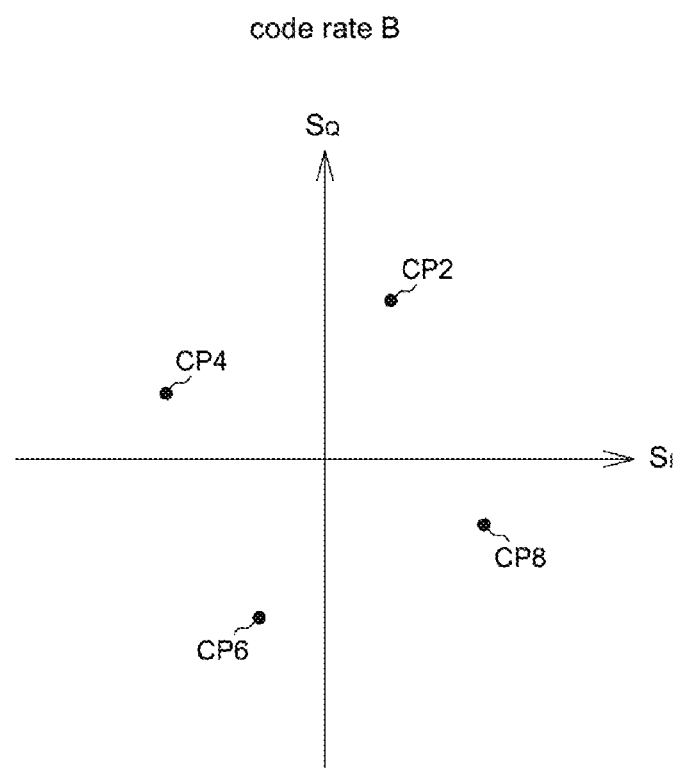

For example, the signal transmitter may transmit signals using two code rates, which both use the QPSK modulation scheme to transmit data and include four constellation points that are evenly arranged around the origin of a complex plane. One code rate A includes constellation points CP1, CP3, CP5 and CP7 in the constellation diagram 20 in FIG. 2, as shown in FIG. 3A. The other code rate B includes constellation points CP2, CP4, CP6 and CP8 of the constellation diagram 20 in FIG. 2, as shown in FIG. 3B. The signal receiving device may perform code rate search according to the falling position of a received signal. Assuming that the signal transmitter transmits signals using the code rate A, the number of signals falling at the constellation points CP1, CP3, CP5 and CP7 is larger than the number of signals falling at the constellation points CP2, CP4, CP6 and CP8. In the above situation, after filtering out the signals located in the mask from the received signals, the ratio of the signals falling at the constellation points CP1, CP3, CP5 and CP7 is frequently larger than a predetermined value. Thus, a threshold may be set for the signal receiving device, so as to determine that the received signal corresponds to the code rate A when it is determined that the ratio of the signals falling at the constellation points CP1, CP3, CP5 and CP7 is greater than the threshold. On the other hand, assuming that the signal transmitter transmits signals using the code rate B, the ratio of the signals falling at the constellation points CP2, CP4, CP6 and CP8 may be similarly determined, and such repeated details are omitted herein.

Figure 4:
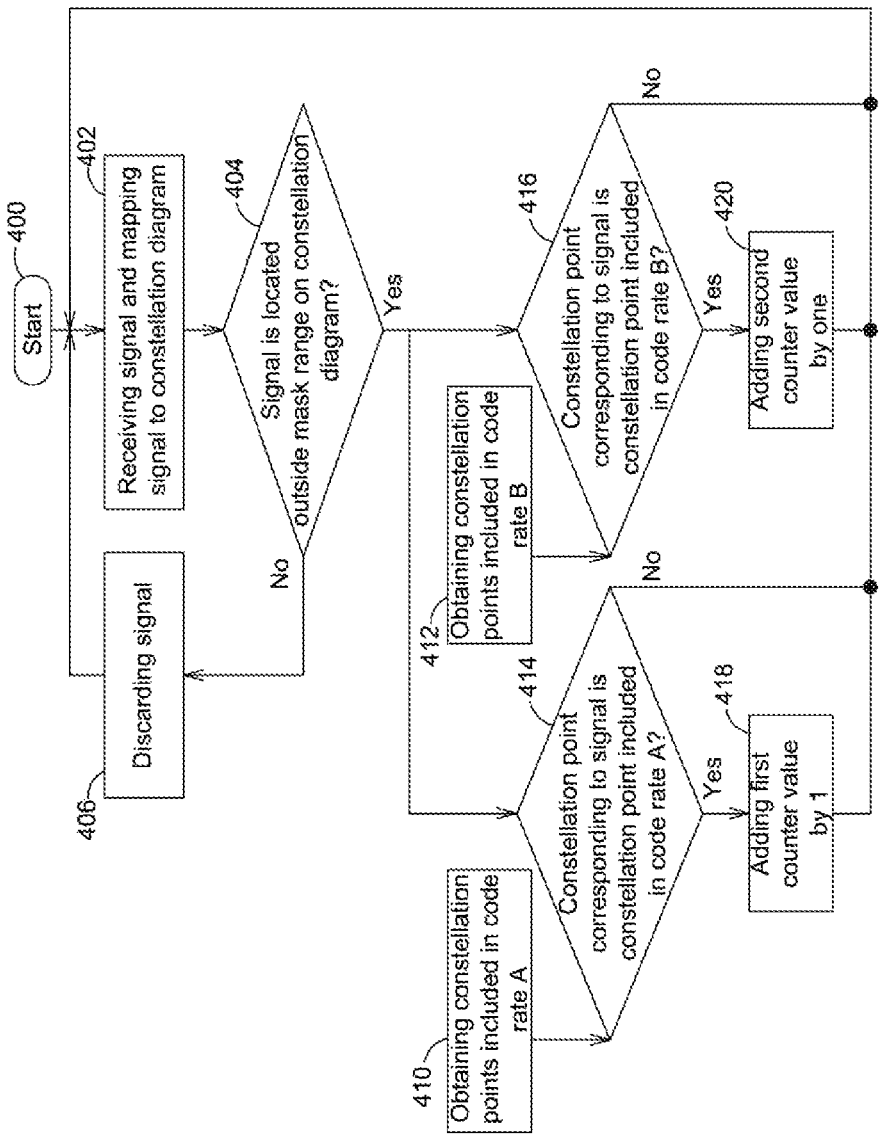
FIG. 4 is a flowchart of a signal detection process according to an embodiment of the present invention.

The above method of mask setting and signal determination may be concluded into a signal detection process 40, as shown in FIG. 4. The signal detection process 40 is applicable to the signal receiving device 10 in FIG. 1, and includes following steps.

In step 400, the process 40 begins.

In step 402, a signal is received and mapped to a constellation diagram.

In step 404, it is determined whether the signal is located outside a mask range on the constellation diagram. Steps 414 and 416 are performed if so, or else step 406 is performed if not.

In step 406, the signal is discarded, and step 402 is performed.

In step 410, constellation points included in a code rate A are obtained.

In step 412, constellation points included in a code rate B are obtained.

In step 414, it is determined whether the constellation point corresponding to the signal is a constellation point included in the code rate A. Step 418 is performed if so, or else step 402 is performed if not.

In step 416, it is determined whether the constellation point corresponding to the signal is a constellation point included in the code rate B. Step 420 is performed if so, or else step 402 is performed.

In step 418, a first counter value is added by one, followed by performing step 402.

In step 420, a second counter value is added by one, followed by performing step 402.

According to the signal detection process 40, the signal receiving device may sequentially determine whether each of signals received within a period is located outside the mask range. If so, it means that the signal is not located at a position at which it is difficult to determine the constellation point corresponding to the signal, and then comparison of the constellation point where the signal is located is performed according to the constellation diagram distributions of the code rates A and B. Steps 414 and 418 and steps S416 and 420 may be simultaneously performed, so as to simultaneously perform the comparison of the signals with the code rates A and B. After the comparison is complete, the process 40 returns to step 402 to determine and compare a next signal, until all signals have been received or until a predetermined period ends.

Figure 5:
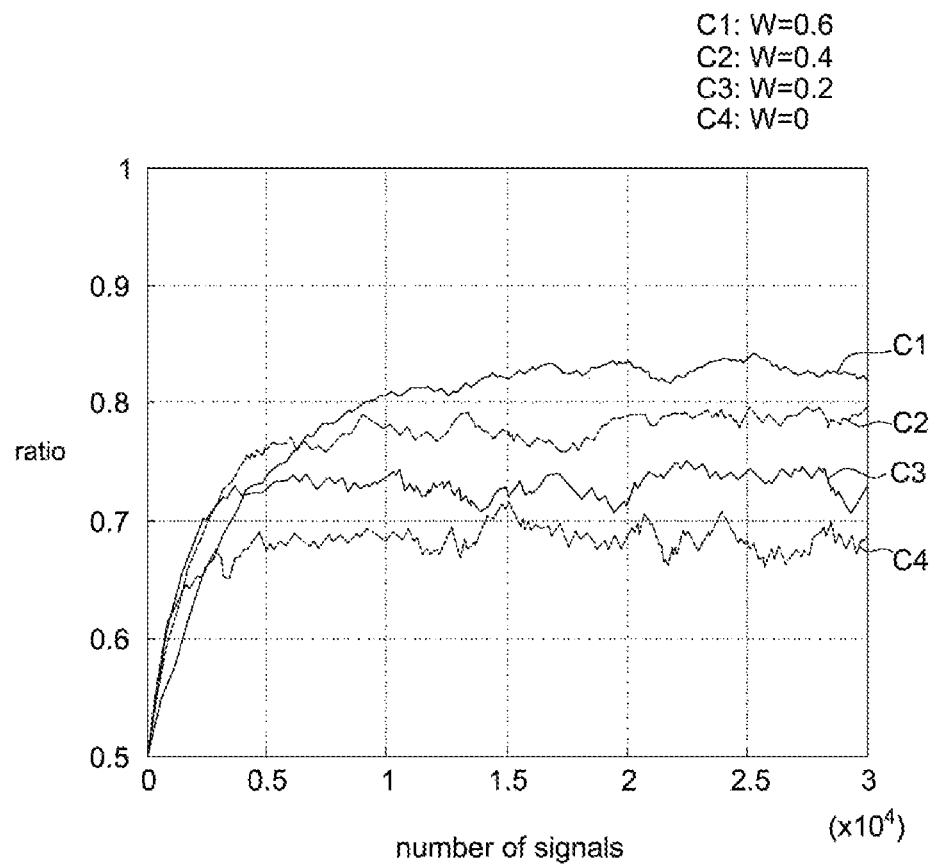
FIG. 5 is a schematic diagram of calculating a ratio of signals located at constellation points of a predetermined constellation diagram distribution under different mask widths.

FIG. 5 shows a schematic diagram of ratios of signals located at predetermined constellation diagram distributions for different mask widths W according to an embodiment of the present invention. In FIG. 5 showing ratio distributions of determined signals, the vertical axis represents the ratio of signals that are outside the mask and located at constellation points of predetermined constellation diagram distributions, and the horizontal axis represents the number of received signals. As the number of signals gets larger, the above ratio approximates a predetermined value. Assuming that signals transmitted from the signal transmitter are of a predetermined code rate, when the receiver compares the received signals with the constellation diagram distribution corresponding to the predetermined code rate, most of the signals fall at the constellation points of the constellation diagram distribution. Therefore, as the number of received signals increases, the ratio of the signals located at the constellation points of the constellation diagram distribution also rises. Conversely, if the code rate that the receiver uses for the comparison is different from the code rate that the signal transmitter uses, the ratio of the signals located at the constellation points of the constellation diagram distribution remains at a lower value (not shown).

FIG. 5 further depicts situations of different mask widths W for comparison. Curves C1 to C3 are situations where the mask width W is equal to 0.6, 0.4 and 0.2 unit, respectively (e.g., the unit in the constellation diagram 20 in FIG. 2). Thus, in these three situations, the numbers of signals filtered out by the mask are also different. Curve C4 represents a situation without any mask. In such situation, all of the signals received are used for determination of the constellation diagram distribution associated with a code rate. As shown in FIG. 5, as the mask width W gets larger, the ratio of the signals located at the constellation points of the predetermined constellation diagram distribution becomes higher and gets closer to 1, meaning that higher accuracy and reliability are obtained when the mask width W is larger (ideally, the ratio of the signals located at the constellation points of the constellation diagram distribution is equal to 1). Further, also known from the curve C4, without any mask, the accuracy obtained is lower. Therefore, the presence of the mask does enhance the reliability. It should be noted that, with a larger mask width W, more signals are filtered out in a way that the curve may rise at a slower speed (e.g., the curve C1), and so a longer detection period or a larger number of signals are needed in order to obtain adequate reliability. One person skilled in the art may choose an appropriate mask width W based on actual requirements.

In addition, the signal receiving device may be configured with a threshold, so as to determine that the signal received correspond to the predetermined code rate when the curve rises and exceeds the threshold or when the curve exceeds the threshold and persists for a predetermined period. For example, assume that the configured threshold is 0.7. Thus, when the signal receiving device determines that, out of signals received within a period and located outside the mask, the ratio of the signals located at constellation points corresponding to the predetermined code rate is greater than 0.7, it is determined that the code rate of the received signals is the predetermined code rate.

It should be noted that, one spirit of the present invention is to provide a method for code rate search, which compares received signals through constellation diagram distributions corresponding to various code rates to further determine whether these signals match a predetermined code rate, and filters out signals for which corresponding constellation points are difficult to determine by using a mask to increase the reliability. One person skilled in the art may accordingly make modifications or variations in addition to the above examples, and such modifications or variations are encompassed within the scope of the present invention. For example, in the above embodiments, the mask is divided by an 8PSK modulation scheme to determine the code rate of signals modulated using QPSK. In other embodiments, other modulation scheme, e.g., 16PSK, may be used to divided the mask to compare signals transmitted by 64QAM or other modulation schemes. Further, the above embodiment (the signal detection process 40 in FIG. 4) includes only one mask configuration for comparing two code rates. In other embodiments, multiple mask configurations may also be used to simultaneously filter received signals, and the signals are then compared using different code rates.

Figure 6:
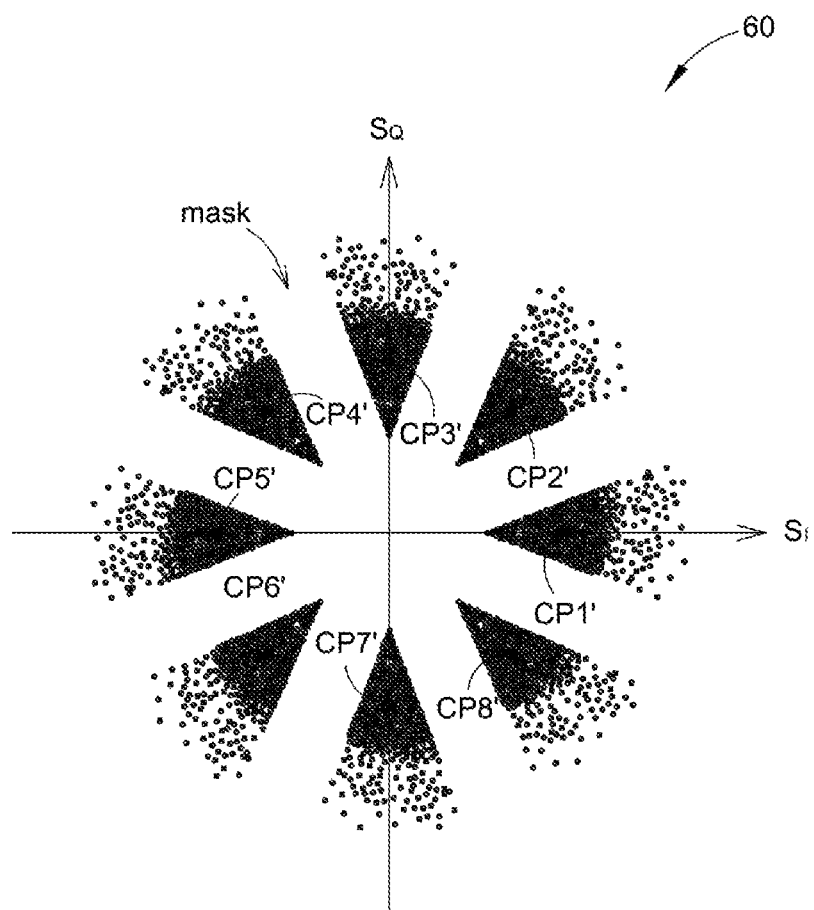
FIG. 6 is a schematic diagram of a constellation diagram according to another embodiment of the present invention.

For example, the signal receiving device may adopt two mask configurations—with one provided according to the constellation points CP1 to CP8 of the 8PSK modulation scheme in FIG. 2, and the other provided according to the constellation points C1' to C8' of another 8PSK modulation scheme, as shown by a constellation diagram 60 in FIG. 6. Similarly, the mask (represented by lines whose slopes are not 0 or ∞) is bordered by straight lines perpendicular to a connecting line between two adjacent constellation points, and substantially covers a range that is approximately equally distanced from the two adjacent constellation points, so as to filter out signals that are difficult to determine and likely cause errors. The code rate comparison is then performed. In one embodiment, constellation points included in a code rate C are the constellation points CP1', CP3', CP5' and CP7' in the constellation diagram 60, and the signal receiving device may perform code rate detection by determining the falling positions of the received signals. Assuming that the signal transmitter transmits signals using the code rate C, the number of signals falling at the constellation points CP1', CP3', CP5' and CP7' is larger than the number of signals falling at the constellation points CP2', CP4', CP6' and CP8'. The signal receiving device may be configured with a threshold, so as to determine that the signal received corresponds to the code rate C when it is determined that the ratio of signals falling at the constellation points CP1', CP3', CP5' and CP7' is greater than the threshold.

Figure 7:
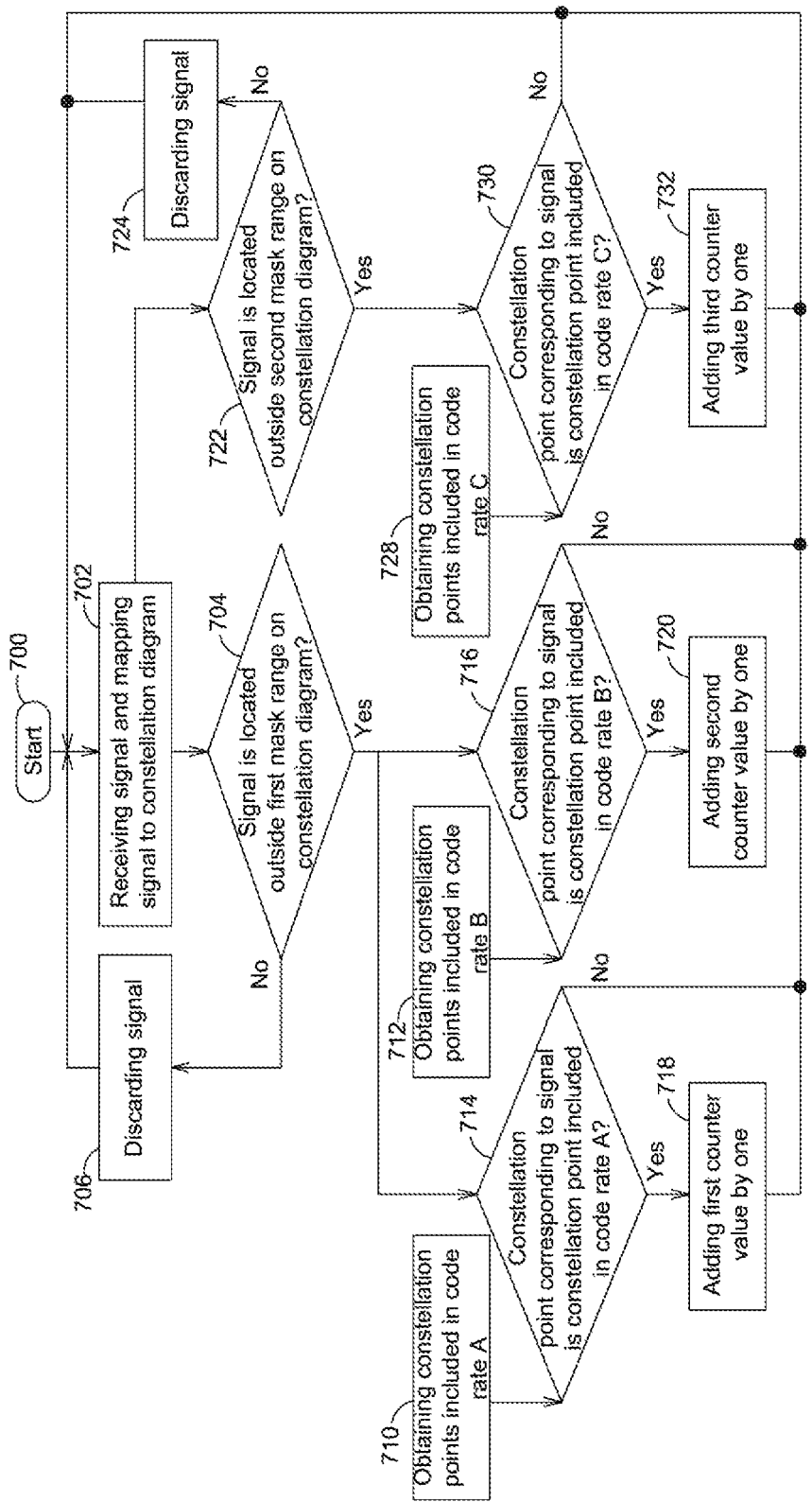
FIG. 7 is a flowchart of a signal detection process according to another embodiment of the present invention.

FIG. 7 shows a flowchart of another signal detection process 70 according to an embodiment of the present invention. The signal receiving device may filter the signals by simultaneously using a first mask range and a second mask range, which respectively correspond to the mask ranges in FIG. 2 and FIG. 6. The signal detection process 70 is applicable to the signal receiving device 10 in FIG. 1, and includes following steps.

In step 700, the process 70 begins.

In step 702, a signal received and mapped to a constellation diagram.

In step 704, it is determined whether the signal is located outside the first mask range. Steps 714 and 716 are performed if so, or else step 706 is performed if not.

In step 706, the signal is discarded, followed by performing step 702.

In step 710, constellation points included in the code rate A are obtained.

In step 712, constellation points included in the code rate B are obtained.

In step 714, it is determined whether the constellation point corresponding to the signal is a constellation point included in the code rate A. Step 718 is performed if so, or else step 702 is performed if not.

In step 716, it is determined whether the constellation point corresponding to the signal is a constellation point included in the code rate B. Step 720 is performed if so, or else step 702 is performed if not.

In step 718, a first counter value is added by one, followed by performing step 702.

In step 720, a second counter value is added by one, followed by performing step 702.

In step 722, it is determined whether the signal is located outside the second mask on the constellation diagram. Step 730 is performed if so, or else step 724 is performed if not.

In step 724, the signal is discarded, followed by performing step 702.

In step 728, constellation points included in the code rate C are obtained.

In step 730, it is determined whether the constellation point corresponding to the signal is a constellation point included in the code rate C. Step 732 is performed if so, or else step 702 is performed.

In step 732, a third counter value is added by one, followed by performing step 702.

Operation details and variations of the signal detection process 70 may be referred from the above description and shall be omitted herein.

In conclusion, the present invention provides a method of code rate search that compares a received signal with constellation diagram distributions corresponding to various code rates to further determine whether the signal matches a predetermined code rate. For signals received within a period, when the ratio of the signals falling at the constellation points corresponding to the predetermined code rate is greater than a threshold hold, it is determined that the received signals correspond to the predetermined code rate. Further, in the present invention, a mask may be provided between every two adjacent constellation points to filter out signals for which the corresponding constellation points are difficult to determine to further enhance the reliability of code rate search.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal detection method, associated with a constellation diagram corresponding to a modulation scheme, for enhancing reliability of code rate search, a mask being included between two adjacent constellation points in the constellation diagram, the signal detection method comprising:
    receiving, by a receiver, a plurality of signals;
    mapping, using a processor, the plurality of signals to the constellation diagram;
    when a first signal among the plurality of signals is located in the mask, discarding the first signal; and
    when a second signal among the plurality of signals is not located in the mask, determining a constellation point corresponding to the second signal.

2. The signal detection method according to claim 1, wherein when the second signal among the plurality of signals is not located in the mask, the step of determining the constellation point corresponding to the second signal comprises:
    obtaining a position on the constellation diagram of the second signal mapped to the constellation diagram, and determining that a constellation point closest to the position as the constellation point corresponding to the second signal.

3. The signal detection method according to claim 1, wherein a border of the mask is perpendicular to a connecting line between the two adjacent constellation points.

4. The signal detection method according to claim 1, further comprising:
corresponding each code rate of a plurality of code rates to a constellation diagram distribution comprising different constellation points in the constellation diagram; and
determining whether the constellation points corresponding to the plurality of signals match a predetermined constellation diagram distribution, and accordingly determining whether the plurality of signals correspond to a code rate corresponding to the predetermined constellation diagram distribution.

5. The signal detection method according to claim 4, wherein the predetermined constellation diagram distribution corresponds to a predetermined code rate, and the step of determining whether the constellation points corresponding to the plurality of signals match the predetermined constellation diagram distribution comprises:
selecting constellation points included in the predetermined constellation diagram distribution from the constellation points of the modulation scheme;
determining whether the constellation points corresponding to the plurality of signals are constellation points included in the predetermined constellation diagram distribution;
when it is determined that the constellation point corresponding to one of the plurality of signals is a constellation point of the predetermined constellation diagram distribution, adding a counter value by one; and
out of the plurality signals located outside the mask, determining a ratio of the constellation points located in the predetermined constellation diagram distribution according to the counter value.

6. The signal detection method according to claim 5, wherein the step of determining whether the plurality of signals correspond to the code rate corresponding to the constellation diagram distribution comprises:
setting a threshold; and
when the ratio is greater than the threshold, determining that the plurality of signals correspond to the predetermined code rate corresponding to the predetermined constellation diagram distribution.

7. A signal receiving device, performing a signal detection method to enhance reliability of code rate search, the signal detection method associated with a constellation diagram corresponding to a modulation scheme, a mask being included between two adjacent constellation points of the constellation diagram, the signal detection device comprising:
a signal receiving module, receiving a plurality of signals;
a processing device, coupled to the signal receiving module, executing a program code; and
a storage unit, coupled to the storage device, storing the program code, the program code instructing the processing device to perform steps of:
mapping the plurality of signals received to the constellation diagram;
when a first signal among the plurality of signals is located in the mask, discarding the first signal; and
when a second signal among the plurality of signals is not located in the mask, determining a constellation point corresponding to the second signal.

8. The signal receiving device according to claim 7, wherein when the second signal among the plurality of signals is not located in the mask, the step of determining the constellation point corresponding to the second signal comprises:
obtaining a position on the constellation diagram of the second signal mapped to the constellation diagram, and determining that a constellation point closest to the position as the constellation point corresponding to the second signal.

9. The signal receiving device according to claim 7, wherein a border of the mask is perpendicular to a connecting line between the two adjacent constellation points.

10. The signal receiving device according to claim 7, wherein the program code further instructs the processing device to perform steps of:
corresponding each code rate of a plurality of code rates to a constellation diagram distribution comprising different constellation points in the constellation diagram; and
determining whether the constellation points corresponding to the plurality of signals match a predetermined constellation diagram distribution, and accordingly determining whether the plurality of signals correspond to a code rate corresponding to the predetermined constellation diagram distribution.

11. The signal receiving device according to claim 10, wherein the predetermined constellation diagram distribution corresponds to a predetermined code rate, and the step of determining whether the constellation points corresponding to the plurality of signals match the predetermined constellation diagram distribution comprises:
selecting constellation points included in the predetermined constellation diagram distribution from the constellation points of the modulation scheme;
determining whether the constellation points corresponding to the plurality of signals are constellation points included in the predetermined constellation diagram distribution;
when it is determined that the constellation point corresponding to one of the plurality of signals is a constellation point of the predetermined constellation diagram distribution, adding a counter value by one; and
out of the plurality signals located outside the mask, determining a ratio of the constellation points located in the predetermined constellation diagram distribution according to the counter value.

12. The signal receiving device according to claim 11, wherein the step of determining whether the plurality of signals correspond to the code rate corresponding to the constellation diagram distribution comprises:
setting a threshold; and
when the ratio is greater than the threshold, determining that the plurality of signals correspond to the predetermined code rate corresponding to the predetermined constellation diagram distribution.

* * * * *